United States Patent
Jung

(10) Patent No.: US 6,324,459 B1
(45) Date of Patent: Nov. 27, 2001

(54) ABRUPT START PREVENTION SYSTEM FOR VEHICLES

(75) Inventor: Jae-Yoon Jung, Kwangmyung (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/692,978

(22) Filed: Oct. 20, 2000

(30) Foreign Application Priority Data

Dec. 30, 1999 (KR) .................................................. 99-66630

(51) Int. Cl.$^7$ ....................................................... F02D 41/22
(52) U.S. Cl. ............................ 701/70; 477/906; 477/907; 123/336; 123/396; 123/399; 123/422; 123/425
(58) Field of Search ................................ 701/70, 45, 114; 74/866; 177/111; 477/107; 123/479, 399; 303/122.09, 11, 122.11, 122.1; 407/907

(56) References Cited

U.S. PATENT DOCUMENTS

| | | | |
|---|---|---|---|
| 4,448,163 | * 5/1984 | Yoshida | 123/422 |
| 4,779,597 | * 10/1988 | Takaku et al. | 123/479 |
| 5,018,408 | * 5/1991 | Bota et al. | 74/866 |
| 5,366,424 | * 11/1994 | Wataya | 477/107 |
| 6,058,346 | * 5/2000 | Wachi et al. | 701/55 |
| 6,092,880 | * 7/2000 | Towers et al. | 303/122.09 |

* cited by examiner

Primary Examiner—William A. Cuchlinski, Jr.
Assistant Examiner—Tuan C To
(74) Attorney, Agent, or Firm—Christie, Parker & Hale, LLP

(57) ABSTRACT

An abrupt start prevention system for vehicles includes a signal input means for receiving engine rpm signals, vehicle speed signals, throttle valve position signals, and primary brake signals. According to the signals, an engine controller outputs control signals to control various elements of an engine according to the signals received from the signal input means. An element driver receives the control signals from the engine controller and driving various elements of the engine according to the control signals. Secondary brake signals are further transmitted to the signal input means so that the engine controller can identify a brake pedal depression even when one of the primary brake signals is not transmitted to the signal input means.

10 Claims, 2 Drawing Sheets

ABRUPT START PREVENTION SYSTEM FOR VEHICLES

BACKGROUND OF THE INVENTION (a) Field of the Invention

The present invention relates to an abrupt start prevention system for vehicles, and more particularly, to a system in which two brake switches are connected to an engine control unit (ECU) such that abrupt starts of the vehicle and sticking of an accelerator pedal can be prevented.

(b) Description of the Related Art

In a conventional vehicle not having cruise control features, since a brake switch is not installed, an ECU is unable to detect driver-operation of the brake pedal. As a result, the engine control system can not structure a control logic to prevent abrupt starts or accelerator pedal sticking problems.

Accordingly, the problem of abrupt starts is controlled by a feature in which the engine can be turned over only if the brake pedal is depressed. However, it is still possible for the vehicle to experience an abrupt start immediately after the engine is started. That is, the engine control system is unable to prevent such a situation from occurring. The engine control system is also unable to prevent abrupt accelerations at other times, including instances where the accelerator pedal is malfunctioning (e.g., sticking) or is depressed too quickly by an inexperienced driver.

Abrupt starts and unintentional abrupt accelerations are caused by a rapid increase in engine rpm, an abrupt increase in fuel injection amounts, the mis-operation of a throttle position valve, and the mis-operation of the engine control system. Since these problems occur very quickly, even the most experienced driver is unable to cope with such situations. Accordingly, to overcome these problems, it is necessary that they are dealt with by the engine control system.

SUMMARY OF THE INVENTION

The present invention has been made in an effort to solve the above problems.

It is an object of the present invention to provide an abrupt start prevention system for vehicles in which primary and secondary brake switches are provided on an input terminal of an engine control system such that fuel injection amounts and engine rpm are controlled if the vehicle is experiencing an abrupt start or if the accelerator pedal is sticking.

To achieve the above object, the present invention provides an abrupt start prevention system for vehicles comprising a signal input means for receiving engine rpm signals, vehicle speed signals, throttle valve position signals, and primary brake signals; an engine controller for outputting control signals to control various elements of an engine according to the signals received from the signal input means; and an element driver for receiving the control signals from the engine controller and driving various elements of the engine according to the control signals, wherein the signal input means further receives secondary brake signals so that the engine controller can identify a brake pedal depression even when one of the primary brake signals is not transmitted to the signal input means.

According to a feature of the present invention, the primary and secondary brake signals are respectively input through primary and secondary brake switches.

According to another feature of the present invention, the engine controller performs an abrupt start prevention operation or an accelerator pedal stick prevention operation if all of the engine rpm signals, throttle valve position signals, and primary and secondary brake signals are input, and discontinues the abrupt start prevention operation or the accelerator pedal stick prevention operation if one of these signals is not input.

According to yet another feature of the present invention, the engine controller comprises a first comparator for comparing the input engine rpm signals with a predetermined value; a second comparator for comparing the input vehicle speed signals with a predetermined value; a first AND gate for multiplying comparison values of the first and second comparators; a logic switch for selecting an engine rpm value when a park P range or a neutral N range signal is input, and for selecting an engine rpm value and a vehicle speed value when a drive D range or a reverse R range signal is input; a third comparator for comparing the input throttle valve position signals with a predetermined value; a fourth comparator for subtracting an existing throttle valve position value from a present throttle valve position value, and comparing a resulting value with a predetermined value; a second AND gate for multiplying comparison values of the third and fourth comparators; a third AND gate for multiplying a primary brake switch value and a secondary brake switch value; a fourth AND gate for multiplying a value output by the second AND gate and a value of the logic switch SW; a fifth AND gate for multiplying a value output by the fourth AND gate and a value output by the third AND gate; a timer for counting a time by an output value of the fifth AND gate; a fifth comparator for comparing a time counted by the timer with a predetermined value, thereby determining if the time of the predetermined value has elapsed; and an abrupt start/accelerator pedal stick prevention logic for performing the abrupt start prevention operation or the accelerator pedal stick prevention operation according to an output of the fifth comparator and not in accordance with the throttle valve position signals.

The abrupt start/accelerator pedal stick prevention logic performs its operation by reducing engine rpm and a fuel injection amount to approximately levels corresponding to that used when the vehicle is idling.

The abrupt start/acceleration pedal stick prevention logic controls an air flow to an actuator to a minimal amount.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
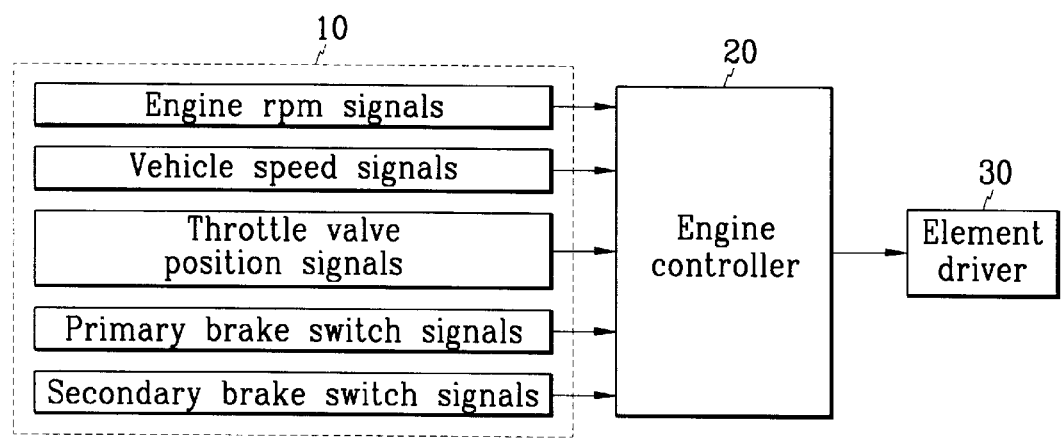
FIG. 1 is a block diagram of an abrupt start prevention system according to a preferred embodiment of the present invention.

FIG. 1 shows a block diagram of an abrupt start prevention system according to a preferred embodiment of the present invention.

The abrupt start prevention system includes signal input means 10 for receiving engine rpm signals, vehicle speed signals, throttle valve position signals, and primary and secondary brake signals; an engine controller 20 for outputting control signals to control various elements of the engine according to the signals received from the signal input means 10; and an element driver 30 for receiving the control signals from the engine controller 20 and driving various elements of the engine according to the control signals.

Figure 2:
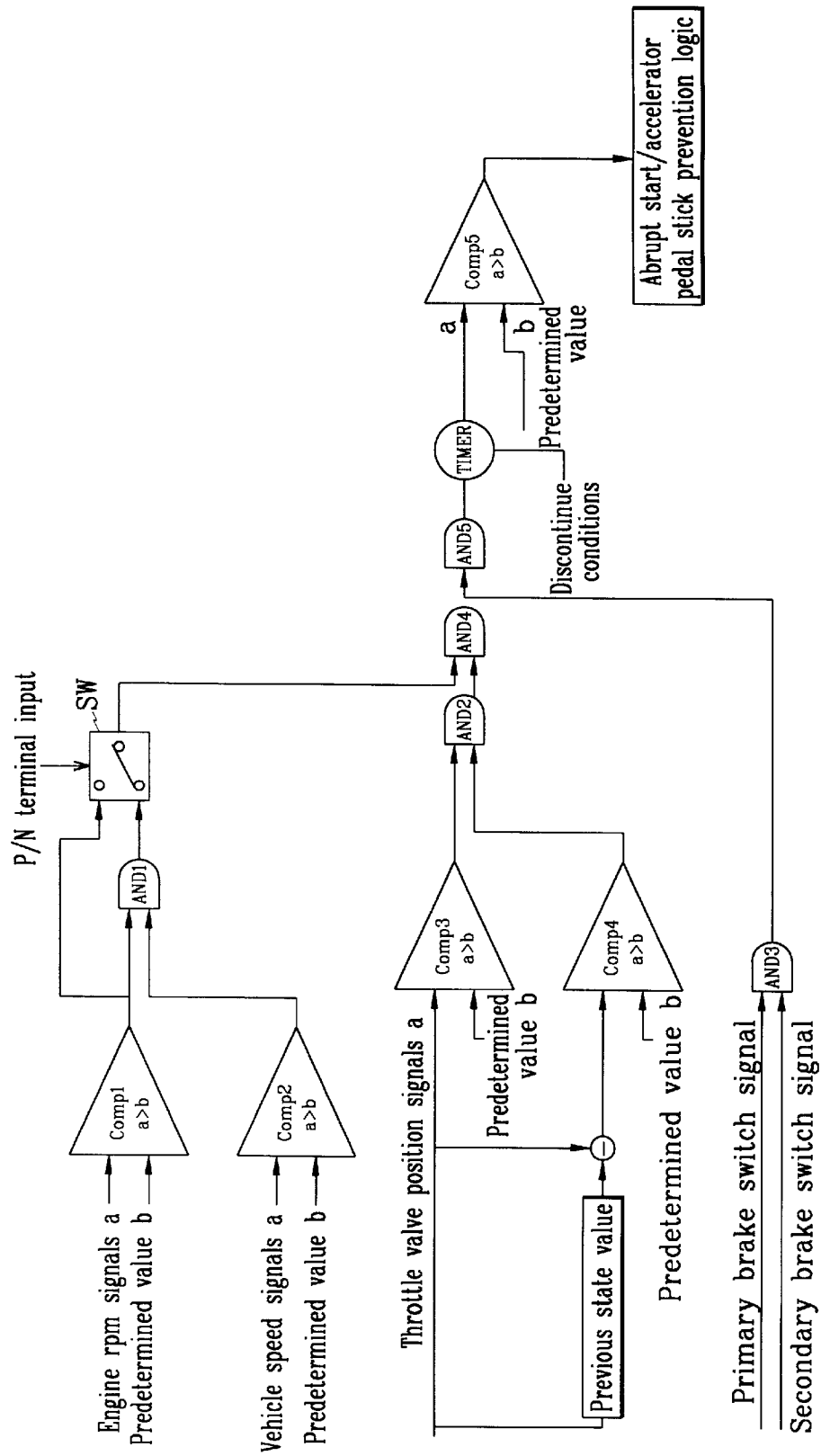
FIG. 2 is a circuit diagram of the abrupt start prevention system of FIG. 1.

With reference to a circuit diagram of the abrupt start prevention system of FIG. 2, the primary and secondary brake signals are input through a primary switch and a secondary brake switch, respectively, the primary brake switches being 4-pin-type brake switches. The engine controller 20 includes a comparator COMP1 for comparing the input engine rpm signals with a predetermined value; a comparator COMP2 for comparing the input vehicle speed signals with a predetermined value; an and gate AND1 for multiplying comparison values of the comparators COMP1 and COMP2; a logic switch SW for selecting an engine rpm value when a park P range or a neutral N range signal is input, and for selecting an engine rpm value and a vehicle speed value when a drive D range or a reverse R range signal is input; a comparator COMP3 for comparing the input throttle valve position signals with a predetermined value; a comparator COMP4 for subtracting an existing throttle valve position value from a present throttle valve position value, and comparing a resulting value with a predetermined value; an and gate AND2 for multiplying comparison values of the comparators COMP3 and COMP4; an and gate AND3 for multiplying a primary brake switch value and a secondary brake switch value; an and gate AND4 for multiplying a value output by the and gate AND2 and a value of the logic switch SW; an and gate AND5 for multiplying a value output by the and gate AND4 and a value output by the and gate AND3; a timer for counting a time by an output value of the and gate AND5; a comparator COMP5 for comparing a time counted by the timer with a predetermined value, thereby determining if the time of the predetermined value has elapsed; and an abrupt start/accelerator pedal stick prevention logic for reducing engine rpm to a minimum level (i.e., slightly above that when idling), and reducing a fuel injection amount to a minimum level (i.e., a level approaching that used when idling).

In the system described above, when the engine is started, engine rpm signals, vehicle speed signals, throttle valve position signals, and primary and secondary brake signals are input to the engine controller 20 from the signal input means 10. The engine controller 20 performs predetermined operations on the received signals using an internal logic, then outputs control signals to the element driver 30 such that the engine is suitably controlled.

In more detail, when the engine rpm signals are received from the signal input means 10, it is determined by the comparator COMP1 of the engine controller 20 if engine rpm are greater than the predetermined value (e.g., 3000 rpm). At a level of rpm less than 3000 rpm, an abrupt start of the vehicle does not occur. It is also determined by the comparator COMP2 if vehicle speed exceeds the predetermined value (e.g., 60 kph). That is, it is determined if the vehicle is travelling at a speed slow enough to be easily stopped by driver-operation of the brake.

Accordingly, the comparison values of the comparators COMP1 and COMP2 are output, then multiplied by the and gate AND1. At this time, the resulting value of the and gate AND1 is not selected by the logic switch SW if a park P range or a neutral N range signal is input, and an engine rpm signal is instead selected and output, whereas the resulting value of the and gate AND1 is selected and output by the logic switch SW if a drive D range or a reverse R range signal is input.

Further, the comparator COMP3 of the engine controller 20 determines if the input throttle valve position signals are greater than the predetermined value, and the comparator COMP4 of the engine controller 20 subtracts the existing throttle valve position value from the present throttle valve position value. The comparator COMP4 then determines if the resulting value is greater than the predetermined value. The and gate AND2 multiplies the comparison values of the comparators COMP3 and COMP4. If the park P range or neutral N range signal is input, engine rpm signals are multiplied with a selected signal by the and gate AND4, and if the drive D range or reverse R range signal is input, the signal multiplied by the and gate AND1 is multiplied with a selected signal by the and gate AND4.

The signals multiplied as in the above are multiplied with brake signals input through the and gate AND5. At this time, the brake signals include both the primary brake signal and the secondary brake signal so that, even when one of the two brake signals is malfunctioning, the engine controller 20 can determine that the brake pedal is being depressed.

Accordingly, since a signal recognizing the brake signal is output to the timer from the and gate AND5, the timer performs a delay operation until a stop condition signal is input. At this time, since the accelerator pedal is not depressed in the case where the brake signals are not input from the signal input means 10 and in the case where the throttle valve position signals are indicative of an increase in throttle valve opening (i.e., when experiencing an abrupt start), the increase in throttle valve opening indicates that the accelerator pedal is further depressed and an abrupt start is not occurring.

Accordingly, if the stop condition signal is input, since a comparison of a delay operation stop time output by the timer with a predetermined value by the comparator COMP5 results in the delay operation stop time being less than the predetermined value, there are no output signals such that the abrupt start/accelerator pedal stick prevention logic does not operate.

However, if the stop condition signal is not input to the timer, the result of comparison of the output delay operation stop time by the comparator COMP5 is greater than the predetermined value. As a result, the abrupt start/accelerator pedal stick prevention logic, regardless of the throttle valve position signals, outputs control signals to the element driver 30 such that engine rpm are reduced to a level just above an idle value, a minimum amount of air is flowed to an idle actuator, a fuel injection amount is also reduced to just above an idle level, and a timing is delayed to a maximum amount. Accordingly, an abrupt start and sticking of the accelerator pedal are prevented.

In the abrupt start prevention system of the present invention as described above, if engine rpm signals, throttle valve position signals, and brake switch signals are all input, abrupt start prevention is performed, whereas this operation is not performed if any of these signals are not input. Accordingly, engine rpm and fuel injection amounts can be controlled during an abrupt start or accelerator pedal sticking.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An abrupt start prevention system for vehicles comprising:
   a signal input means for producing engine rpm signals, vehicle speed signals, throttle valve position signals, and primary brake signals;
   an engine controller for outputting control signals to control various elements of an engine according to the signals received from the signal input means, wherein the engine controller performs an abrupt start prevention operation or an accelerator pedal stick prevention operation if all of the engine rpm signals, throttle valve position signals, and brake signals are input, and discontinues the abrupt start prevention operation or the accelerator pedal stick prevention operation if one of these signals is not input; and
   an element driver for receiving the control signals from the engine controller and driving various elements of the engine according to the control signals,
   wherein the signal input means receives secondary brake signals so that the engine controller can identify a brake pedal depression even when one of the primary brake signals is not transmitted to the signal input means.

2. The system of claim 1 wherein the primary and secondary brake signals are respectively input through primary and secondary brake switches.

3. The system of claim 1 wherein the engine controller comprises,
   a first comparator for comparing the input engine rpm signals with a predetermined value,
   a second comparator for comparing the input vehicle speed signals with a predetermined value,
   a first AND gate for multiplying comparison values of the first and second comparators,
   a logic switch for selecting an engine rpm value when a park P range or a neutral N range signal is input, and for selecting an engine rpm value and a vehicle speed value when a drive D range or reverse R range signal is input,
   a third comparator for comparing the input throttle valve position signals with a predetermined value,
   a fourth comparator for subtracting an existing throttle valve position value from a present throttle valve position value, and comparing a resulting value with a predetermined value,
   a second AND gate for multiplying comparison values of the third and fourth comparators,
   a third AND gate for multiplying a primary brake switch value and a secondary brake switch value,
   a fourth AND gate for multiplying a value output by the second AND gate and a value of the logic switch SW,
   a fifth AND gate for multiplying a value output by the fourth AND gate and a value output by the third AND gate,
   a timer for counting a time based on an output value of the fifth AND gate,
   a fifth comparator for comparing a time counted by the timer with a predetermined value, thereby determining if the time of the predetermined value has elapsed, and
   an abrupt start/accelerator pedal stick prevention logic for performing the abrupt start prevention operation or the accelerator pedal stick prevention operation according to an output of the fifth comparator and not in accordance with the throttle valve position signal.

4. The system of claim 3, wherein the abrupt start prevention operation or an accelerator pedal stick prevention operation reduces engine rpm and a fuel injection amount to approximately levels corresponding to that used when the vehicle is idling.

5. The system of claim 3 wherein the abrupt start prevention operation or an accelerator pedal stick prevention operation controls an air flow to an actuator to a minimal amount.

6. The system of claim 1 wherein the abrupt start prevention operation or an accelerator pedal stick prevention operation reduces engine rpm and a fuel injection amount to approximately levels corresponding to that used when the vehicle is idling.

7. The system of claim 1 wherein the abrupt start prevention operation or an accelerator pedal stick prevention operation controls an air flow to an actuator to a minimal amount.

8. An abrupt start prevention system for vehicles comprising:
   a signal input means for producing engine rpm signals, vehicle speed signals, throttle valve position signals, and primary brake signals;
   an engine controller for outputting control signals to control various elements of an engine according to the signals received from the signal input means, wherein the engine controller comprises,
   a first comparator for comparing the input engine rpm signals with a predetermined value,
   a second comparator for comparing the input vehicle speed signals with a predetermined value,
   a first AND gate for multiplying comparison values of the first and second comparators,
   a logic switch for selecting an engine rpm value when a park P range or a neutral N range signal is input, and for selecting an engine rpm value and a vehicle speed value when a drive D range or reverse R range signal is input,
   a third comparator for comparing the input throttle valve position signals with a predetermined value,
   a fourth comparator for subtracting an existing throttle valve position value from a present throttle valve position value, and comparing a resulting value with a predetermined value,
   a second AND gate for multiplying comparison values of the third and fourth comparators,
   a third AND gate for multiplying a primary brake switch value and a secondary brake switch value,
   a fourth AND gate for multiplying a value output by the second AND gate and a value of the logic switch SW,
   a fifth AND gate for multiplying a value output by the fourth AND gate and a value output by the third AND gate,
   a timer for counting a time based on an output value of the fifth AND gate, a fifth comparator for comparing a time counted by the timer with a predetermined value, thereby determining if the time of the predetermined value has elapsed, and an abrupt start/accelerator pedal stick prevention logic for performing the abrupt start prevention operation or the accelerator pedal stick prevention operation according to an output of the fifth comparator and not in accordance with the throttle valve position signal; and an element driver for receiving the control signals from the engine controller and driving various elements of the engine according to the control signals, wherein the signal input means further receives secondary brake signals so that the engine controller can identify a brake pedal depression even when one of the primary brake signals is not transmitted to the signal input means.

9. The system of claim 8 wherein the abrupt start prevention operation or an accelerator pedal stick prevention operation reduces engine rpm and a fuel injection amount to approximately levels corresponding to that used when the vehicle is idling.

10. The system of claim 8 wherein the abrupt start prevention operation or an accelerator pedal stick prevention operation controls an air flow to an actuator to a minimal amount.

\* \* \* \* \*